(12) United States Patent
Becher et al.

(10) Patent No.: US 7,665,802 B2
(45) Date of Patent: Feb. 23, 2010

(54) SLIDING ROOF SYSTEM

(75) Inventors: Thomas Becher, Rodgau (DE); Horst Boehm, Frankfurt/Main (DE); Rainer Grimm, Frankfurt/Main (DE); Joachim Roeder, Muehlheim (DE)

(73) Assignee: ArvinMeritor GmbH, Dietzenbach (DE)

( * ) Notice: Subject to any disclaimer, the term of this patent is extended or adjusted under 35 U.S.C. 154(b) by 272 days.

(21) Appl. No.: 11/858,444

(22) Filed: Sep. 20, 2007

(65) Prior Publication Data

US 2008/0073942 A1 Mar. 27, 2008

(30) Foreign Application Priority Data

Sep. 25, 2006 (EP) .................................. 06019985

(51) Int. Cl.
*B60J 7/05* (2006.01)
(52) U.S. Cl. ...................................................... 296/221
(58) Field of Classification Search .................. 296/221
See application file for complete search history.

(56) References Cited

U.S. PATENT DOCUMENTS

| 4,919,475 | A | * | 4/1990 | Schlapp et al. ............... 296/213 |
| 5,020,849 | A | * | 6/1991 | Schlapp et al. ............... 296/221 |
| 5,344,209 | A | * | 9/1994 | Regner ........................ 296/223 |
| 5,421,635 | A | * | 6/1995 | Reinsch et al. .......... 296/220.01 |
| 5,484,185 | A | * | 1/1996 | Salz et al. .............. 296/220.01 |
| 2002/0024238 | A1 | * | 2/2002 | Farber ........................ 296/222 |
| 2004/0256892 | A1 | * | 12/2004 | Bergmiller et al. ...... 296/220.01 |
| 2005/0110307 | A1 | * | 5/2005 | Grimm et al. ................ 296/223 |
| 2005/0231007 | A1 | * | 10/2005 | Oechel .................. 296/220.01 |

FOREIGN PATENT DOCUMENTS

| DE | 4301635 C1 | 1/1994 |
| EP | 1393944 A2 | 3/2004 |
| JP | 06239144 A | 8/1994 |
| JP | 06336116 A | 12/1994 |

OTHER PUBLICATIONS

European Search Report Dated Mar. 6, 2007.

* cited by examiner

*Primary Examiner*—Dennis H Pedder
(74) *Attorney, Agent, or Firm*—Carlson, Gaskey & Olds

(57) ABSTRACT

A sliding roof system includes at least one guide rail, a carriage that is shiftable in the guide rail, and a cover support which together with a cover can be adjusted by shifting the carriage between a closed position, a lifted venting position, and a lowered open position. The cover support is provided with studs that engage in the carriage. The carriage is located outside a contour of the cover as seen in a top view of the sliding roof system.

9 Claims, 10 Drawing Sheets

SLIDING ROOF SYSTEM

RELATED APPLICATIONS

The application claims priority to European Application No. 06 019 985.8, which was filed on Sep. 25, 2006.

BACKGROUND OF THE INVENTION

The invention relates to a sliding roof system that includes at least one guide rail, a carriage shiftable in the guide rail, a cover support that can be adjusted by shifting the carriage between a closed position, a lifted venting position, and a lowered open position, and where the cover support is provided with studs that engage in the carriage.

A cover is connected with the cover support of the sliding roof system and closes a roof opening in the closed position of the sliding roof system. In the lifted venting position, a rear edge of the cover, as seen in a traveling direction of a vehicle, is raised outwards relative to a roof. In the open position, the cover is shifted to lie underneath a roof sheet that is located behind the roof opening.

In general, an aim with such sliding roof systems is that an opening exposed by the cover, which does not necessarily have to be identical with the roof opening, is as large as possible. It is also desirable that a clear width of the opening, which is perceived by a vehicle occupant, i.e. transverse to a vehicle longitudinal axis, is as large as possible.

It is the object of the invention to further develop a sliding roof system of the type initially mentioned to the effect that a particularly large clear width of the opening will be produced.

SUMMARY OF THE INVENTION

To this end, a sliding roof system is provided where a carriage is located outside a contour of a cover as seen in a top view of the sliding roof system. In one example, a clear space is provided between a cover support and the carriage, as measured along a longitudinal axis of studs that engage in the carriage, which is in the order of a width of the carriage. The invention is based on a fundamental idea of arranging guide rails and components received in the guide rails, such as the carriage, at a position further outside, so that a larger clear width is obtained. With such an arrangement, the studs of the cover support can be lengthened in a mechanically simple fashion such that the studs span the clear space that arises when the guide rails are arranged further outside, while the cover support remains unchanged. This is surprising as it was presumed that the studs on the cover support should be as short as possible and hence the carriage should be arranged on the cover support as close as possible in order to achieve a high stability.

According to one example embodiment of the invention, a guide rail is provided with a duct for a drive cable, with the duct being located behind the carriage as seen from the cover support. This measure also contributes to achieving a clear width of the opening, which is as large as possible. As such, the drive cables are no longer located in a region which is critical for the clear width, but instead are "outside" laterally of the carriage.

These and other features of the present invention can be best understood from the following specification and drawings, the following of which is a brief description.

DETAILED DESCRIPTION OF THE PREFERRED EMBODIMENT

Figure 1:
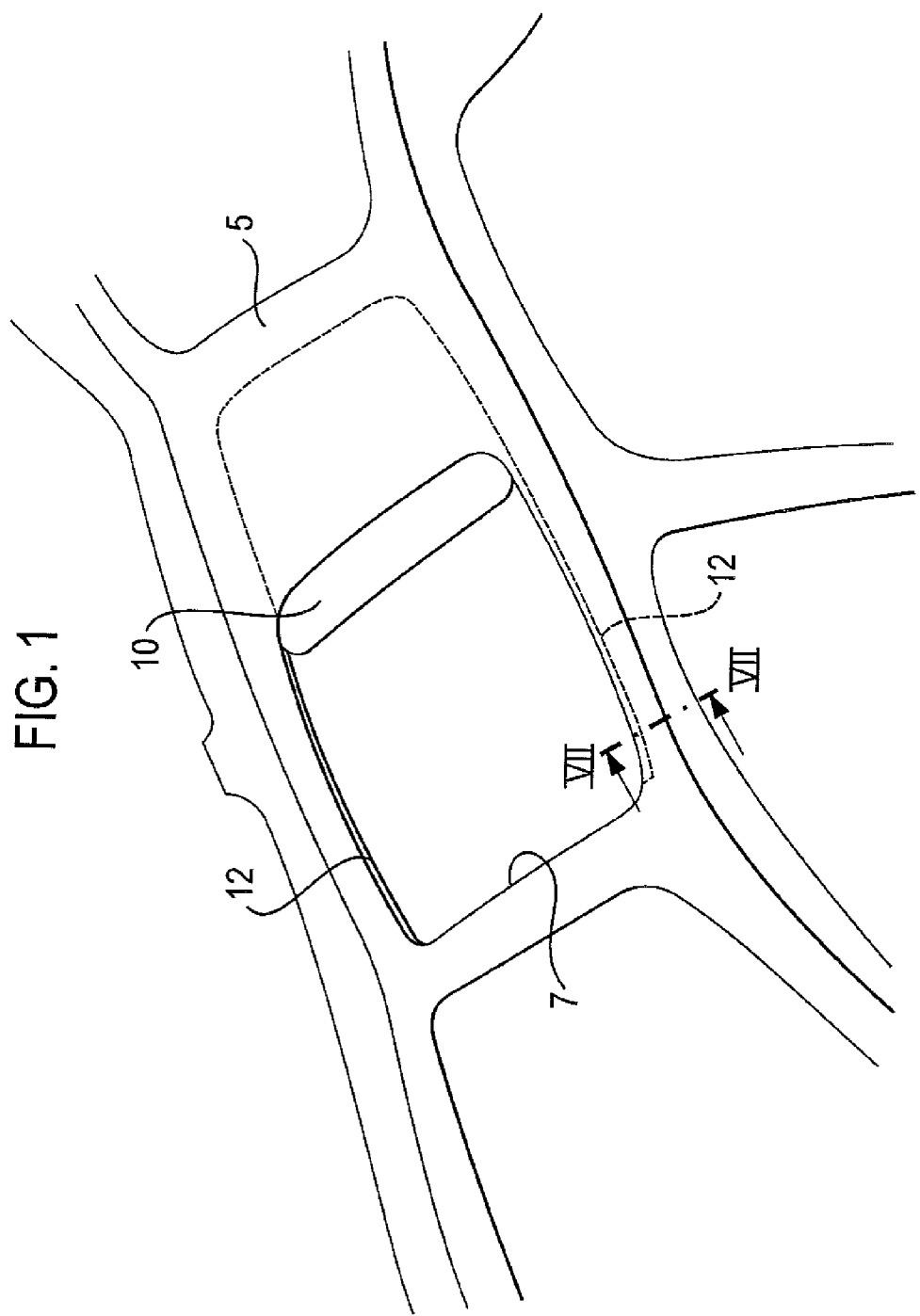
FIG. 1 shows a vehicle roof with a sliding roof system in a schematic view.

FIG. 1 shows a sliding roof system that is attached to a roof 5 of a vehicle. A roof opening 7 is provided in a roof sheet. The roof opening 7 can be closed or exposed by a cover 10. In the illustration of FIG. 1, the cover 10 is in a nearly completely open position, in which the cover 10 is shifted rearwardly to lie underneath the roof sheet of the roof 5.

Terms such as "top" or "rear" refer to a usual traveling direction and orientation of a vehicle. In this context, "front" corresponds to an x-direction, "top" corresponds to a z-direction, and "lateral" corresponds to a y-direction of an ordinary coordinate system.

Figure 2:
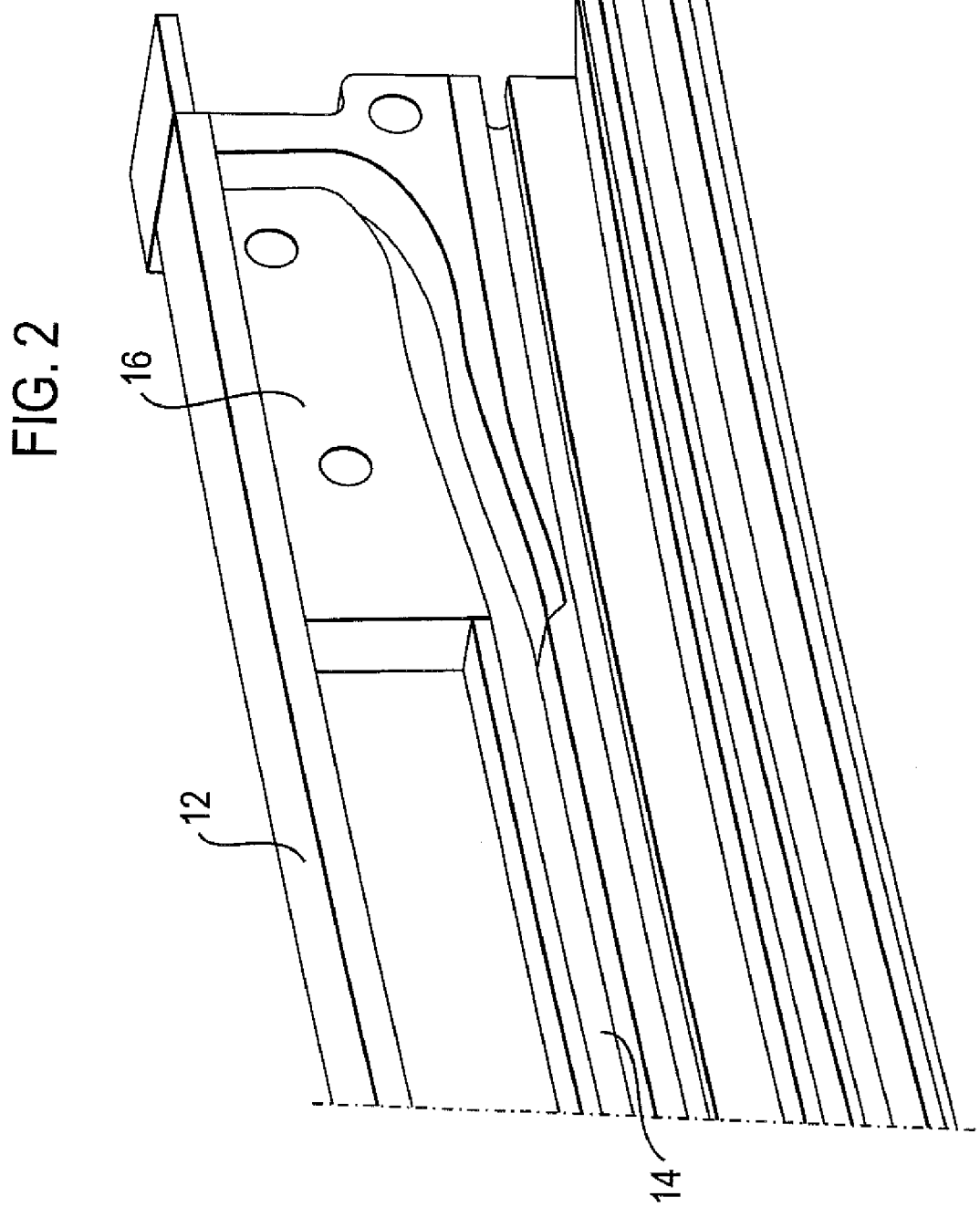
FIG. 2 shows a front end of a guide rail of the sliding roof system according to the invention.

Guide rails 12 extend along longitudinal edges of the roof opening 7 (see also FIG. 2). One guiding slot 14 (see also FIG. 8) is formed in each guide rail 12. The guiding slot 14 initially extends vertically downwards, as viewed from front to rear. A curved transition portion follows, which in turn is adjoined by an approximately horizontally extending portion. The latter is followed by a portion that extends slightly obliquely downwards, and which in turn is adjoined by a very long portion that extends parallel to a direction of extension of the respective guide rail 12. The guide rail 12 has an insert piece 16 (see FIG. 2) at a front portion, which comprises all portions of the guiding slot 14 that are not parallel to the direction of extension of the guide rail 12. This allows the guide rail 12 to be produced as a continuously extruded part.

Figure 3:
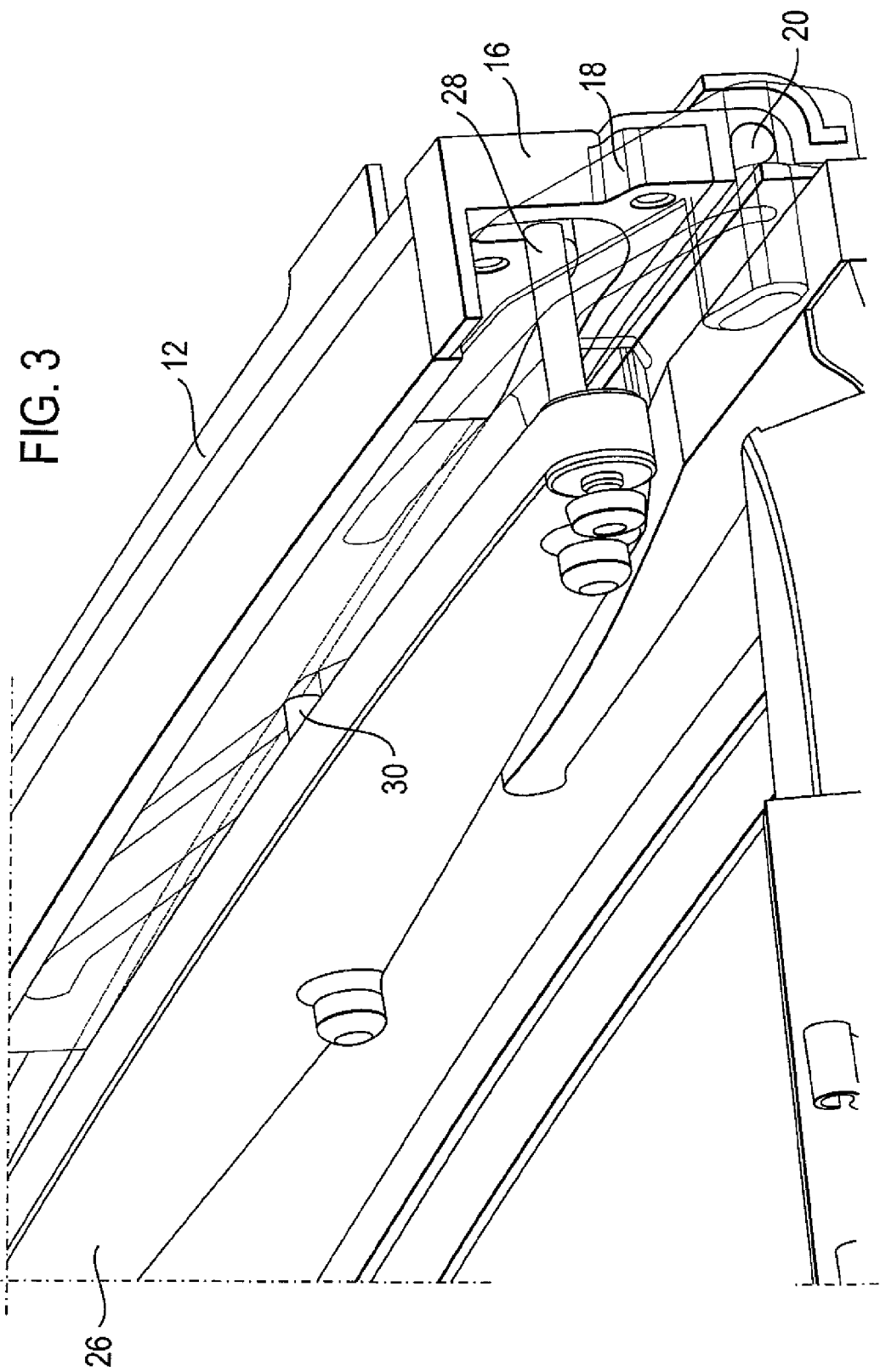
FIG. 3 shows a perspective view of the sliding roof system according to the invention.
Figure 5:
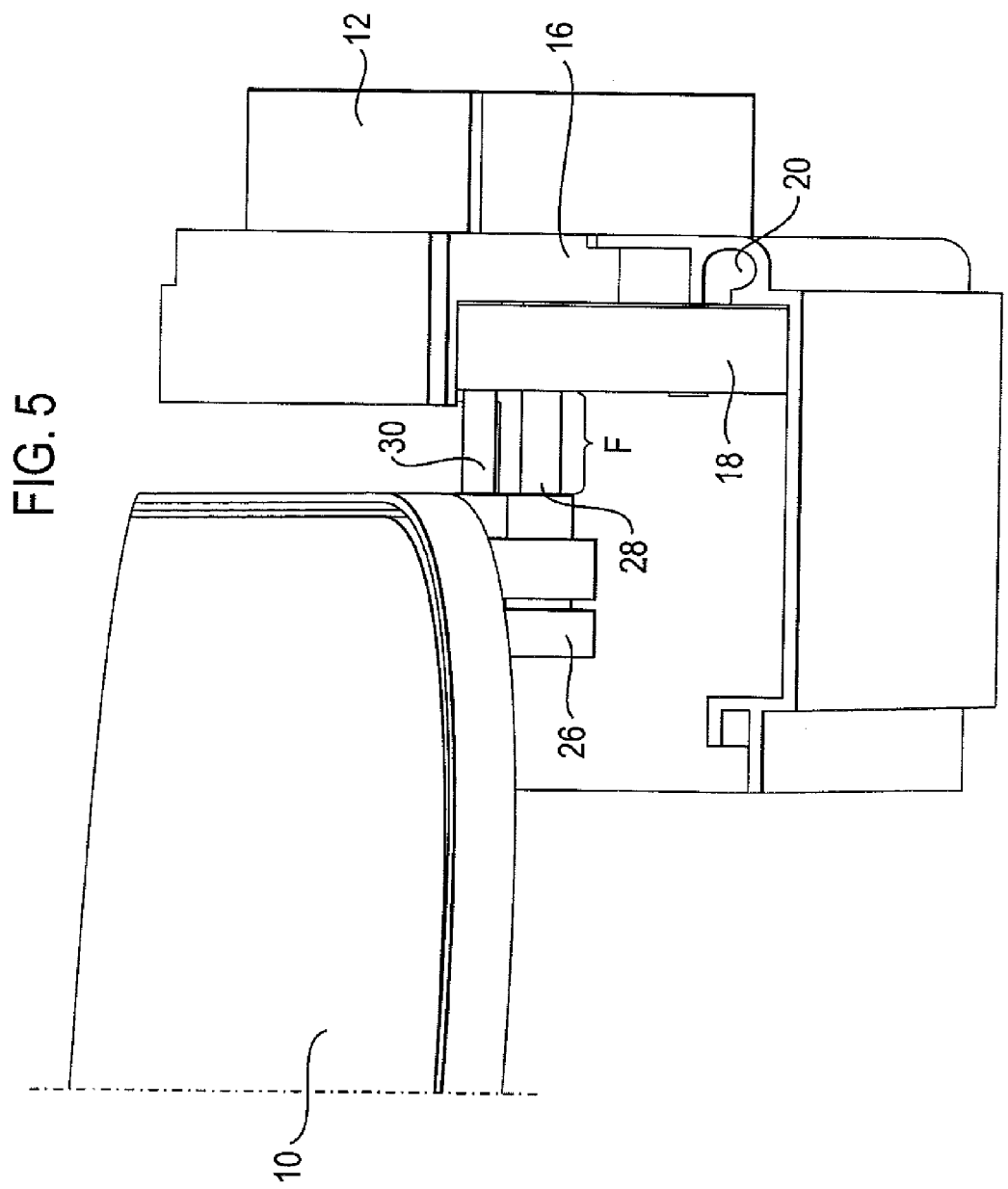
FIG. 5 shows, in a view as seen obliquely from above, the sliding roof system according to the invention, where an adjoining rigid roof has been omitted.

Each guide rail 12 movably receives a carriage 18 (see in particular FIGS. 3 and 5). The carriage 18 can be shifted in the respective guide rail 12 by a drive cable (not illustrated) that is received in a guide duct 20 of the guide rail 12. The carriage 18 has a raising slot 22 at a front end (see in particular FIG. 8) and a lifting slot 24 at a rear end. As seen from the front to the rear, the raising slot 22 has a first portion, which is a comparably steep upwardly extending portion, followed by a second portion, which is not as steep as the first portion, and finally an adjoining third portion that again is not as steep as the second portion. As seen from the front to the rear, the lifting slot 24 has a horizontal portion, a portion which extends obliquely upwards, a horizontal intermediate portion, another portion which extends obliquely upwards, and a horizontally extending end portion. The obliquely extending front portion has a higher gradient than the obliquely extending rear portion.

Figure 4:
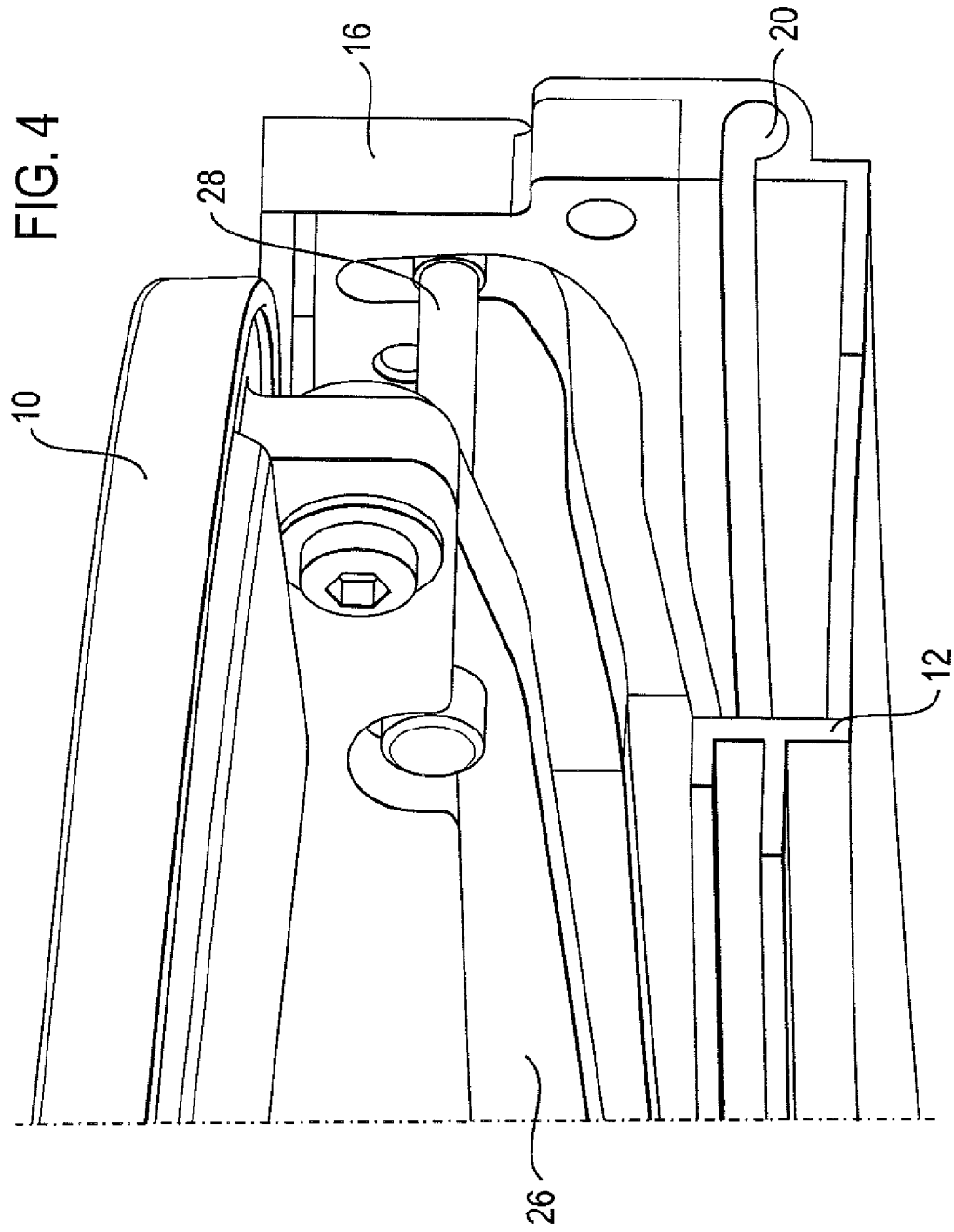
FIG. 4 shows a detail of a front end of the sliding roof system according to the invention, with a carriage having been omitted for better clarity.
Figure 6:
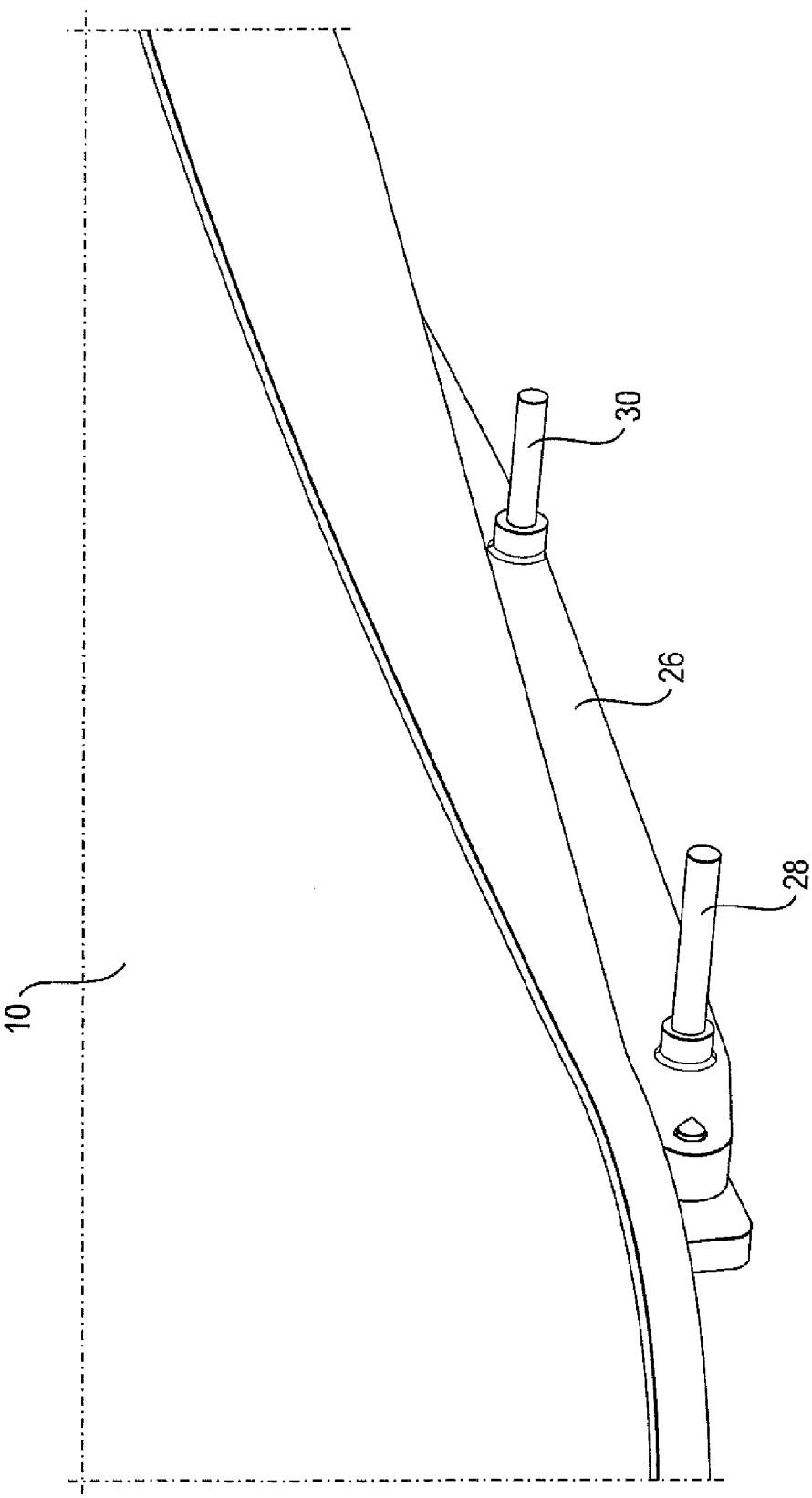
FIG. 6 shows, in a perspective view, a cover support with a cover of the sliding roof system according to the invention.

A cover support 26 (see in particular FIGS. 3, 4 and 6) cooperates with the carriage 18 and the guiding slot 14 of each guide rail 12. The cover 10 is fastened to both cover supports 26. Each cover support 26 is provided with two studs, namely a front stud 28 and a rear stud 30. The front stud 28 is long enough to penetrate into the raising slot 22 of the carriage 18, and extends as far as into the guiding slot 14 of the guide rail 12 (see in particular FIG. 3). The rear stud 30 is long enough to engage in the lifting slot 24 of the carriage 18.

In a top view, i.e. as seen from above (cf. FIG. 5), the carriage 18 is laterally spaced from an outer contour of the cover 10 and is located underneath the adjoining, firm roof sheet.

An important feature of the sliding roof system is that a clear space F is present between the cover support 26 and the carriage 18. This clear space F is spanned by the front and rear studs 28, 30 and can be seen in FIG. 5. In FIG. 5, the roof 5 and seal 6 (cf. FIG. 7) are omitted for clarification.

Figure 7:
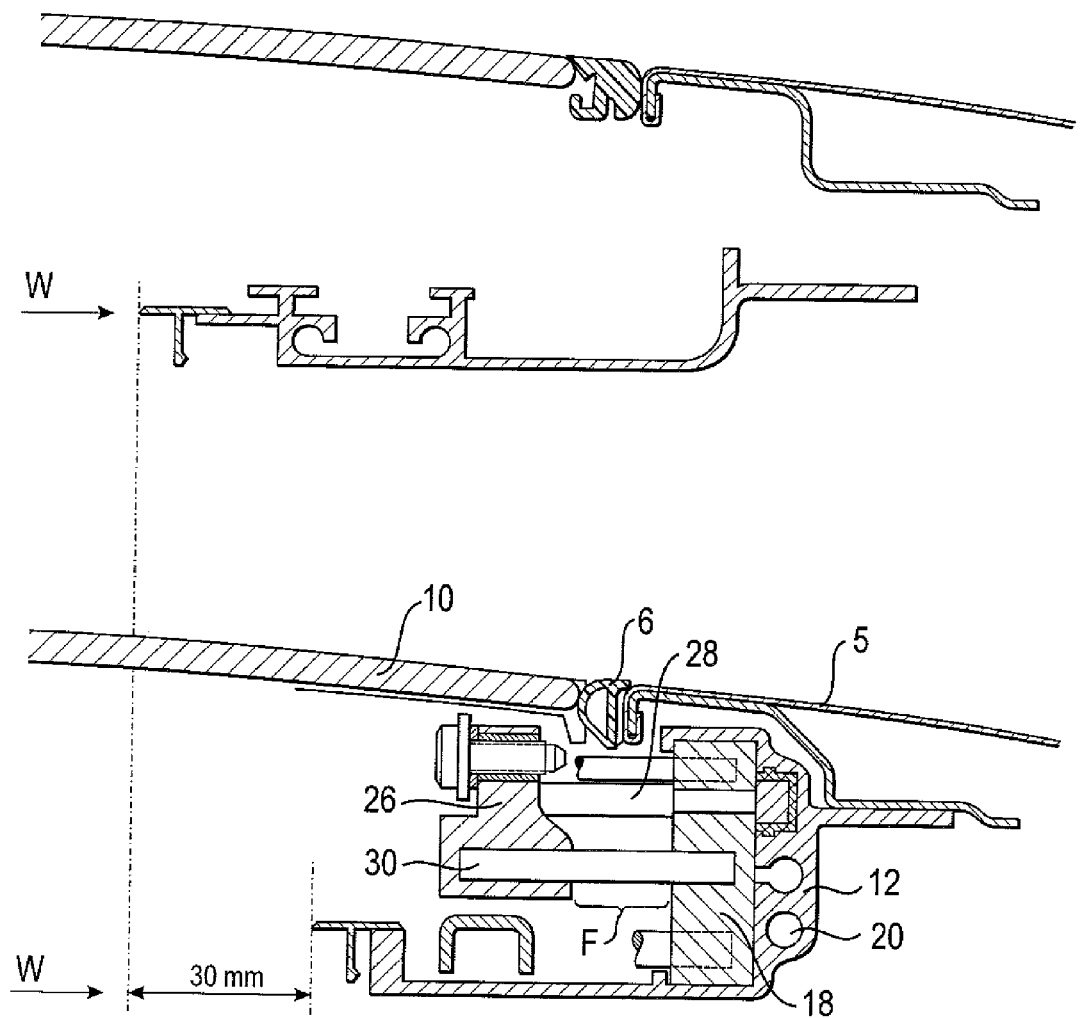
FIG. 7 shows a comparison between a clear width with the sliding roof system according to the invention and a conventional sliding roof system.

FIG. 7 shows the effect provided by the usage of the clear space F between the cover support 26 and the carriage 18. The upper part of FIG. 7 shows a conventional guide rail for a conventional sliding roof. The lower part of FIG. 7 shows a cross-section of the sliding roof system according to the invention. It can be seen that with the sliding roof system according to the invention a clear width W, measured between the two guide rails 12 which are opposite to one another, is larger on each side by approximately 30 mm, i.e. in total by 60 mm. This represents a substantial benefit in terms of comfort for the vehicle occupants. In FIG. 7 one can also see that the clear width W is not dictated by a width of the roof opening 7, but of the guide rails 12 of the sliding roof system.

The mode of operation of the sliding roof system will now be described in reference to FIGS. 8 to 10. In a closed state (see FIG. 8), the front stud 28 of the cover support 26 is located in the front, vertically extending portion of the guiding slot 14, and is located approximately in a middle portion of the raising slot 22. As the guiding slot 14 and raising slot 22 roughly intersect each other at an angle of 90°, the front stud 28 is fixed both in both the x and z directions. The rear stud 30 is located in the horizontally extending intermediate portion of the lifting slot 24. In this way, the rear stud 30 is fixed in the z-direction. As two spaced points of the cover support 26 are fixed in the x-direction and the front stud 28 additionally is fixed in the z-direction, the cover 10 is precisely positioned in the closed position.

Figure 8:
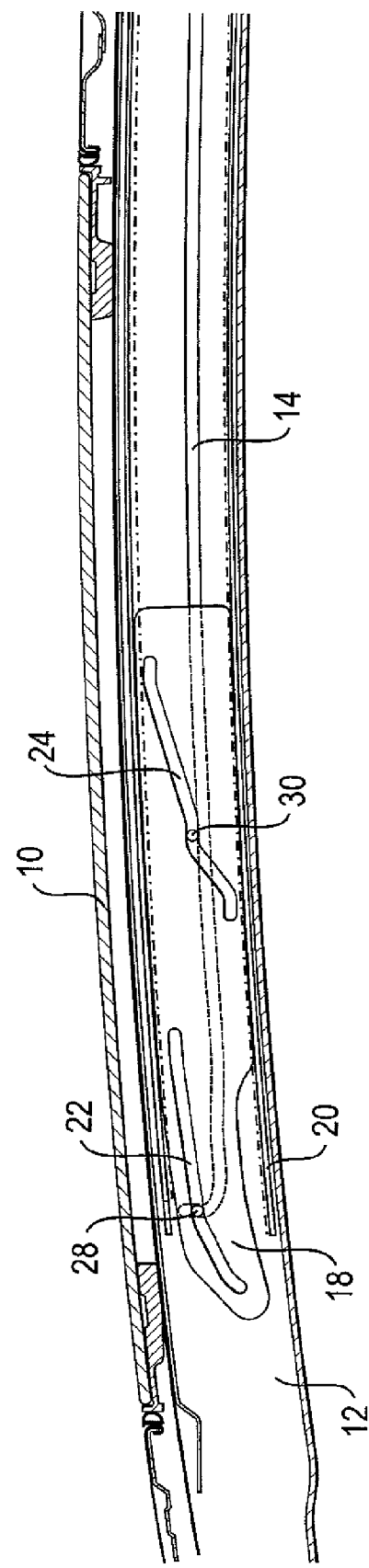
FIG. 8 is a schematic side view of the sliding roof system according to the invention, with the cover being in the closed position.
Figure 9:
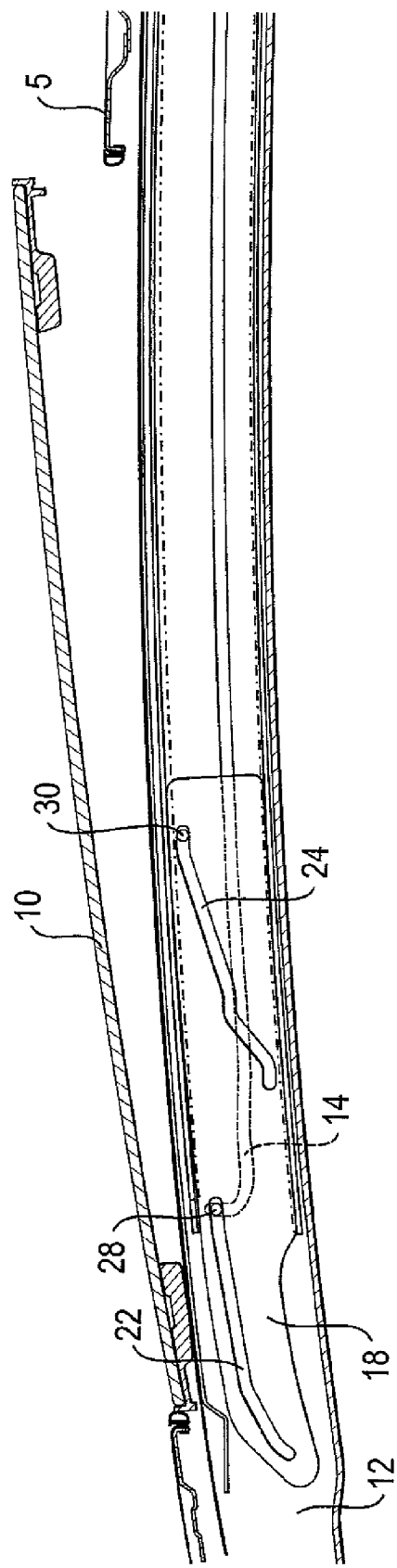
FIG. 9 shows the sliding roof system of FIG. 8, where the cover is in a venting position.
Figure 10:
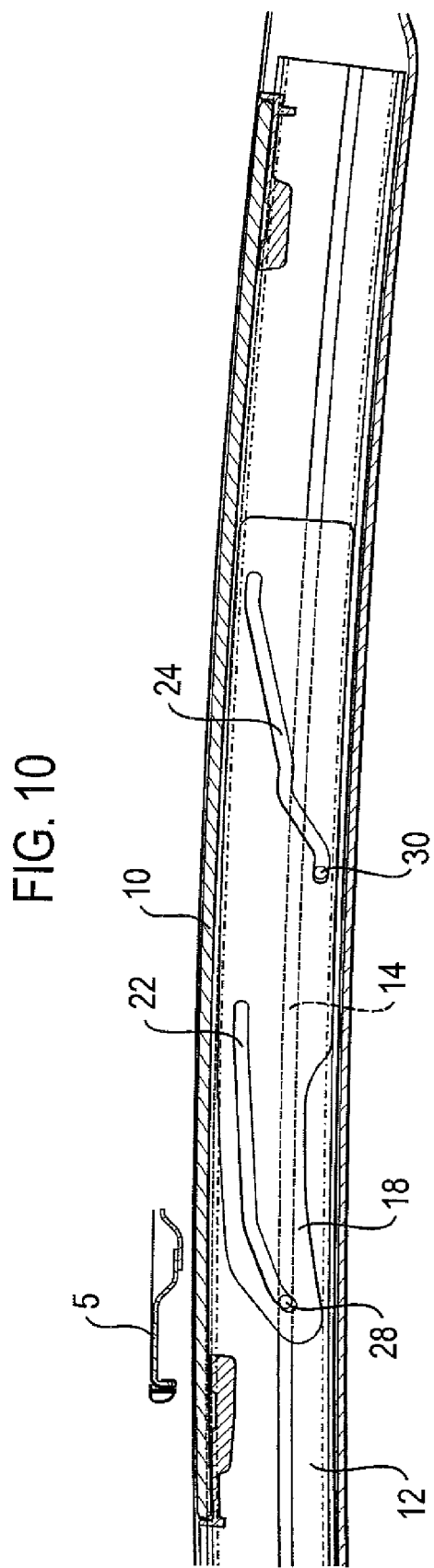
FIG. 10 shows the sliding roof system of FIG. 8, where the cover is in an open position.

In order to get from the closed position to a venting position as shown in FIG. 9, the carriage 18 (starting from the position shown in FIG. 8) is shifted to the front, i.e. to the left related to FIGS. 8 to 10. In this process, the rear stud 30 travels upward in the lifting slot 24, while at the same time the front stud 28 is slightly moved upwards in the vertically extending portion of the guiding slot 14 by the raising slot 22. These two movements superpose in such a manner that a rear edge of the cover 10 is raised outwards, while a front edge of the cover 10 is only slightly lowered.

The open position of the cover 10 shown in FIG. 10 is reached starting from the closed position shown in FIG. 8. Starting from the position shown in FIG. 8, the carriage 18 is shifted to the rear in the guide rail 12, i.e. to the right related to the FIGS. 8 to 10. In this process, the rear stud 30 travels downwards in the lifting slot 24, and the front stud 28 travels in the raising slot 22 and, hence, in the guiding slot 14 downward such that the front stud 28 enters the approximately horizontally extending portion of the guiding slot 14. In this position, the front stud 28, the cover support 26 and the cover 10 in the guide rails 12 can be entrained to the rear position shown in FIG. 10 by the carriage 18, in which the cover 10 lies almost completely underneath the roof sheet of the vehicle roof 5.

In order to close the cover 10, the carriage 18 is again moved to the front until the situation of FIG. 8 is achieved.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A sliding roof system comprising:
   at least one guide rail;
   a carriage that is shiftable in the at least one guide rail;
   a cover support that together with a cover can be adjusted by shifting the carnage between a closed position, a lifted venting position, and a lowered open position; and
   studs provided with the cover support, the studs engaging in the carriage and including at least a front stud that projects through a raising slot formed in the carriage and engages in a guiding slot formed in the at least one guide rail, and wherein the carriage is located outside a contour of the cover as seen in a top view of the sliding roof system.

2. The sliding roof system according to claim 1, wherein a clear space is provided between the cover support and the carriage as measured along a longitudinal axis of the studs.

3. The sliding roof system according to claim 2, wherein a width of the clear space generally corresponds to a width of the carriage.

4. The sliding roof system according to claim 1, wherein the studs comprise two studs for each carriage.

5. The sliding roof system according to claim 1, wherein the studs include at least a rear stud that engages in a lifting slot formed in the carriage.

6. The sliding roof system according to claim 1, wherein the at least one guide rail has a duct for a drive cable, the duct being located behind the carriage as seen from the cover support.

7. The sliding roof system according to claim 1, wherein the at least one guide rail has a guiding slot that is engaged by the front stud of the cover support, the guiding slot having a portion at a front end that extends essentially vertically downward.

8. The sliding roof system according to claim 7, wherein the guiding slot is defined in sections by an insert piece attached to the at least one guide rail.

9. The sliding roof system according to claim 1, wherein the contour of the cover is defined in part by at least laterally spaced and longitudinally extending edges, and wherein the carriage is spaced laterally outwardly relative to the laterally spaced and longitudinally extending edges.

* * * * *